(12) United States Patent
Matsushima

(10) Patent No.: US 7,400,367 B2
(45) Date of Patent: Jul. 15, 2008

(54) VIEWING ANGLE CONTROL ELEMENT, DISPLAY DEVICE, AND ELECTRONIC APPARATUS

(75) Inventor: Toshiharu Matsushima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 10/832,275

(22) Filed: Apr. 27, 2004

(65) Prior Publication Data

US 2004/0252258 A1 Dec. 16, 2004

(30) Foreign Application Priority Data

May 9, 2003 (JP) ............... 2003-131672
Feb. 2, 2004 (JP) ............... 2004-025421

(51) Int. Cl.
*G02F 1/1347* (2006.01)
*G02F 1/1335* (2006.01)
*G02F 1/13* (2006.01)

(52) U.S. Cl. ............... 349/76; 349/75; 349/96; 349/101; 349/193

(58) Field of Classification Search ............ 349/74, 349/101, 75–76, 193
See application file for complete search history.

(56) References Cited

U.S. PATENT DOCUMENTS

| | | | | |
|---|---|---|---|---|
| 4,653,865 | A | | 3/1987 | Kando et al. ............ 349/101 |
| 4,815,825 | A | * | 3/1989 | Nakagomi et al. ......... 349/101 |
| 4,927,240 | A | * | 5/1990 | Stolov et al. ............ 349/81 |
| 5,061,045 | A | * | 10/1991 | Yoneya et al. ............ 349/172 |
| 5,241,408 | A | | 8/1993 | Ishikawa et al. |
| 5,448,386 | A | * | 9/1995 | Watanabe et al. ........... 349/119 |
| 5,570,211 | A | * | 10/1996 | Hanaoka et al. ........... 349/74 |
| 5,572,343 | A | * | 11/1996 | Okamura et al. ........... 349/74 |
| 5,642,214 | A | * | 6/1997 | Ishii et al. ............ 349/96 |
| 5,680,184 | A | * | 10/1997 | Nishino ............ 349/78 |
| 5,751,385 | A | * | 5/1998 | Heinze ............ 349/61 |
| 5,781,265 | A | * | 7/1998 | Lee ............ 349/171 |
| 5,928,801 | A | * | 7/1999 | Broer et al. ............ 428/690 |
| 6,181,309 | B1 | * | 1/2001 | Mori et al. ............ 345/88 |
| 6,411,355 | B1 | | 6/2002 | Manabe et al. |

(Continued)

FOREIGN PATENT DOCUMENTS

EP  0 802 684 A2  10/1997

(Continued)

OTHER PUBLICATIONS

Sumitomo 3M Ltd., "Light Control Film," searched on Feb. 5, Heisei 15 (2003), Internet, <URL: http://www.mmm.co.jp/display/light>.

*Primary Examiner*—Andrew Schechter
*Assistant Examiner*—W. Patty Chen
(74) *Attorney, Agent, or Firm*—Oliff & Berridge, PLC

(57) ABSTRACT

The invention provides a viewing angle control element capable of realizing high information concealment without damaging brightness of transmitted light and dynamically changing a viewing angle in accordance with need or no need of information concealment. The viewing angle control element according to the invention can include liquid crystal twist-aligned by approximately 180°, and have a liquid crystal layer being electrically controllable and a pair of polarizing layers provided at both sides of the liquid crystal layer. Optical axes of both polarizing layers can be arranged to be substantially parallel to each other, and liquid crystal molecules of the liquid crystal layer adjacent to the polarizing layers can be aligned to be substantially parallel to the optical axes of the polarizing layers.

55 Claims, 10 Drawing Sheets

U.S. PATENT DOCUMENTS

| | | |
|---|---|---|
| 6,490,076 B2 | 12/2002 | Pepper |
| 6,642,984 B1 * | 11/2003 | Yoshida et al. ............... 349/139 |
| 6,671,017 B2 * | 12/2003 | Lyu et al. .................... 349/118 |
| 2002/0154377 A1 | 10/2002 | Pepper ....................... 359/245 |
| 2003/0007227 A1 | 1/2003 | Ogino ........................ 359/227 |
| 2004/0105060 A1 | 6/2004 | Lyu et al. |

FOREIGN PATENT DOCUMENTS

| | | |
|---|---|---|
| JP | 61 046930 A | 3/1986 |
| JP | A 5-40277 | 2/1993 |
| JP | A 05-108023 | 4/1993 |
| JP | A 9-166794 | 6/1997 |
| JP | A 2002-40429 | 2/2002 |
| JP | A 2002-297044 | 10/2002 |
| JP | A 2003-015535 | 1/2003 |
| JP | A 2004-062094 | 2/2004 |
| KR | 1990-008302 A | 6/1990 |
| KR | 1992-16892 | 9/1992 |
| KR | 1997-22417 | 5/1997 |
| KR | 1997-28719 | 6/1997 |
| KR | 2001-111823 | 12/2001 |

* cited by examiner

VIEWING ANGLE CONTROL ELEMENT, DISPLAY DEVICE, AND ELECTRONIC APPARATUS

BACKGROUND OF THE INVENTION

1. Field of Invention

The present invention relates to a viewing angle control element, a display device, and an electronic apparatus.

2. Description of Related Art

In general, image display devices provided in word processors, computers, or the like, display manipulation result of an operator together with various data on screens. In such image display devices, the brightness, the contrast ratio and the width of viewing angle of display are required, and with enhancement of such characteristics, works can be easily performed and fatigue due to the works can be reduced. On the other hand, recently, when secrecy of works is high or when computers or mobile phones are used in public places of public transportation such as trains or buses, image display devices having techniques for concealing the displayed image from persons around the operator have been required more and more. In this use, even if the image display devices have high display performance, the place for use is limited, or the image display devices are used while paying attention to surroundings, so that troubles in use may occur. Therefore, for the purpose of improving concealment of the displayed images, optical components for limiting viewing angles of the display devices or display devices having the optical components have been suggested. See, Japanese Unexamined Patent Application Publication No. 2002-297044 and "Light Control Film" published by Sumitomo 3M Ltd. (on-line) (searched on February 5, Heisei 15 (2003)), Internet, <URL: http://www.mmm.cojp/display/light>.

SUMMARY OF THE INVENTION

In the above display device, by attaching an optical film with a narrow viewing angle to the front face of a display element, such as a liquid crystal panel, the viewing angle can be restricted. However, in this construction of attaching the optical film, since works are performed always with a narrow viewing angle and brightness of display is a little dark as seen from the front thereof, deterioration of usability in a usual use results from the improved concealment of displayed images.

The invention has been made to solve the above problems, and it is an object of the invention to provide a viewing angle control element capable of realizing high information concealment without damaging brightness of transmitted light and of dynamically changing a viewing angle in accordance with need or no need of information concealment.

Furthermore, it is another object of the invention to provide a display device capable of realizing high information concealment without damaging display characteristics as seen from the front thereof and of dynamically changing a viewing angle in accordance with need or no need of information concealment.

A viewing angle control element according to the invention can include a liquid crystal layer being electrically controllable and a pair of polarizing layers provided on both sides of the liquid crystal layer. According to this configuration, the emission angle of light transmitted through the viewing angle control element can be freely adjusted by a voltage applied to the liquid crystal layer, so that when the viewing angle control element is arranged on the front face of a display medium, such as a display element, it is possible to freely enlarge and lessen the range of a viewing angle.

In the viewing angle control element according to the invention, it is preferable that optical axes of the pair of polarizing layers are arranged to be substantially parallel to each other. As a result, it is easy to hold a high transmissivity as seen from the front thereof.

In the viewing angle control element according to the invention, it is preferable that the liquid crystal layer includes liquid crystal twist-aligned by approximately 180°, and liquid crystal molecules adjacent to the polarizing layers are aligned to be substantially parallel to the optical axes of the polarizing layers. According to this configuration, it is possible to obtain a viewing angle control element having an excellent viewing angle control function and efficiently using the optical characteristics of the liquid crystal layer including the twist-aligned liquid crystal.

In the viewing angle control element according to the invention, an alignment axis of the liquid crystal layer and absorption axes of the polarizing layers may be arranged to be substantially perpendicular to each other. According to this configuration, since a high transmissivity in all directions can be obtained in a case of a wide viewing angle and the transmissivity in a specific direction can be effectively reduced in a case of a narrow viewing angle, it is possible to provide a viewing angle control element suitable for a viewing angle restriction device specifically provided in a display element.

In the viewing angle control element according to the invention, an alignment axis of the liquid crystal layer and absorption axes of the polarizing layers may be arranged to be substantially parallel to each other. This configuration also allows a high transmissivity in all directions to be obtained in a case of a wide viewing angle and the transmissivity in a specific direction to be effectively reduced in a case of a narrow viewing angle. Thus, it is possible to provide a viewing angle control element suitable for a viewing angle restriction device specifically provided in a display element.

In the viewing angle control element according to the invention, product $\Delta nd$ of the refractive-index anisotropy $\Delta n$ of the liquid crystal layer and the thickness d of the liquid crystal layer may be equal to or greater than 1.0 μm. By allowing $\Delta nd$ of the liquid crystal layer to fall within the above range, the transmissivity of the viewing angle control element in its front direction can be enhanced, so that it is possible to obtain a display device which is bright as seen from the front side when the viewing angle control element is provided on the front surface of the display element.

In the viewing angle control element according to the invention, product $\Delta nd$ of the refractive-index anisotropy $\Delta n$ of the liquid crystal layer and the thickness d of the liquid crystal layer may be equal to or less than 8.0 μm. Accordingly, a sufficient range of viewing angle can be obtained in controlling the viewing angle. Even when the liquid crystal layer is driven with a relatively low voltage, the emission angle of transmitted light can be controlled excellently, so that it is possible to reduce the power consumption of the viewing angle control element.

In the viewing angle control element according to the invention, product $\Delta nd$ of the refractive-index anisotropy $\Delta n$ of the liquid crystal layer and the thickness d of the liquid crystal layer may be equal to or greater than 2.0 μm and equal to or less than 5.0 μm. By setting the range of $\Delta nd$ as described above, a high transmissivity can be obtained in the front side of the viewing angle control element, and it is also possible to provide a viewing angle control element capable of properly controlling the emission angle of transmitted light even when it is driven with a low voltage.

In the viewing angle control element according to the invention, a phase difference layer may be provided between the pair of polarizing layers. According to this configuration, it is possible to further enhance the viewing angle restriction function. In the viewing angle control element according to the present invention, the phase difference layer may be provided on both sides of the liquid crystal layer. By arranging the phase difference layer as described above, it is possible to further enhance the viewing angle restriction function.

In the viewing angle control element according to the invention, it is preferable that the phase difference layer has an optical characteristic of mainly giving a phase difference to a component of light transmitted through the phase difference layer in its thickness direction. According to this configuration, when the viewing angle control element is arranged at the front side of a display device, etc., it is not necessary to consider in-plane phase difference such as symmetry of the viewing angle characteristic, etc., so that it is easy to optically design the display device, etc.

A display device according to the invention can include the viewing angle control element described above and a display element. The viewing angle of the display element can be adjusted by the viewing angle control element. According to this configuration, it is possible to obtain a display device capable of freely controlling the viewing angle by using a function of controlling the emission angle of transmitted light by means of the viewing angle control element. Accordingly, it is possible to provide a display device very convenient for use, the display device being capable of effectively accomplishing the concealment of information from a third party by narrowing the viewing angle of the viewing angle control element in a situation requiring a high information concealment, and being seen well by an operator by widening the viewing angle of the viewing angle control element in a situation other than the aforementioned situation.

In the display device according to the invention, the display element may include a liquid crystal display element, and the viewing angle control element may be provided on the front surface or the back surface of the liquid crystal display element. According to this configuration, it is possible to provide a liquid crystal display device very convenient for use, the display device being capable of effectively accomplishing the concealment of information from a third party by narrowing the viewing angle of the viewing angle control element in a situation requiring a high information concealment, and being seen well by an operator by widening the viewing angle of the viewing angle control element in a situation other than the aforementioned situation.

In the display device according to the invention, the polarizing layer of the viewing angle control element on the liquid crystal display element side may function as a polarizing layer of the liquid crystal display element. According to this configuration, it is possible to decrease the thickness of the display device, compared with a case where a display device is constructed by combining a viewing angle control element and a liquid crystal display element prepared separately. Furthermore, since the number of components can be reduced, it contributes to reduction of manufacturing cost.

In the display device according to the invention, an optical rotation device for adjusting a deviation between an optical axis of a polarizing layer provided on a viewing angle control element forming surface of the liquid crystal display element and the optical axes of the polarizing layers of the viewing angle control element may be provided between the liquid crystal display element and the viewing angle control element.

According to this configuration, when the optical axis of the polarizing layers of the viewing angle control element and the optical axis of the liquid crystal display element are deviated from each other, the light transmitted through one polarizing layer can be converted into the light having a polarized direction parallel to the optical axis of the other polarizing layer by means of the optical rotation means, and then can be made incident on the other polarizing layer. Therefore, the light can be prevented from being absorbed between the viewing angle control element and the liquid crystal display element, so that it is possible to provide a display device capable of accomplishing a bright display.

In the display device according to the invention, the optical rotation device may be a half-wave plate, or may have twist-aligned liquid crystal. According to this configuration, the light can be prevented from being absorbed between the viewing angle control element and the liquid crystal display element, so that it is possible to provide a display device capable of accomplishing a bright display.

In the display device according to the invention, the display element may be an EL display element, a circularly polarizing layer may be provided between the EL display element and the viewing angle control element, and the polarizing layer of the viewing angle control element on the EL display element side may constitute a part of the circularly polarizing layer. According to this configuration, since the polarizer provided with the circularly polarizing layer can be allowed to function as the polarizing layer of the viewing angle control element, it is possible to easily accomplish decrease of the thickness of the device. Furthermore, a specular effect of the EL display element can be effectively prevented by means of operation of the circularly polarizing layer, so that a display with a high quality can be obtained.

An electronic apparatus according to the invention may include the viewing angle control element according to the present invention described above. Further, the electronic apparatus according to the invention may include the display device according to the present invention described above. Since the electronic apparatus includes the viewing angle control element or the display device according to the invention, a visible condition of information can be freely controlled by using the viewing angle control function of the viewing angle control element, so that it is possible to easily perform the concealment of information from a third party and to provide excellent visibility of information to the operator.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1A:
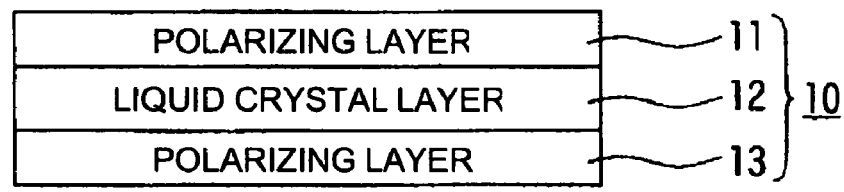
FIG. 1(a) is a schematic sectional view illustrating the basic structure of a viewing angle control element according to a first embodiment.

Now, embodiments of the invention will be described with reference to the accompanying drawings, but respective elements are shown in the drawings to be referred hereafter with the scales of film thickness or dimension thereof being made appropriately different from each other so that the drawings can be seen more conveniently.

Figure 1B:
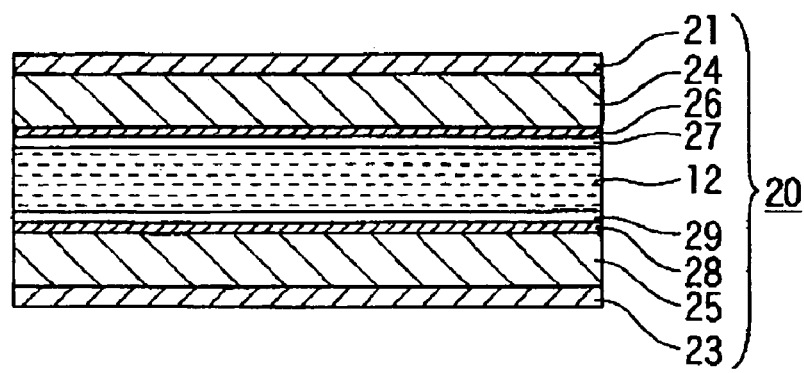
FIG. 1(b) is a schematic sectional view illustrating a structural example of the viewing angle control element according to the first embodiment.
Figure 2:
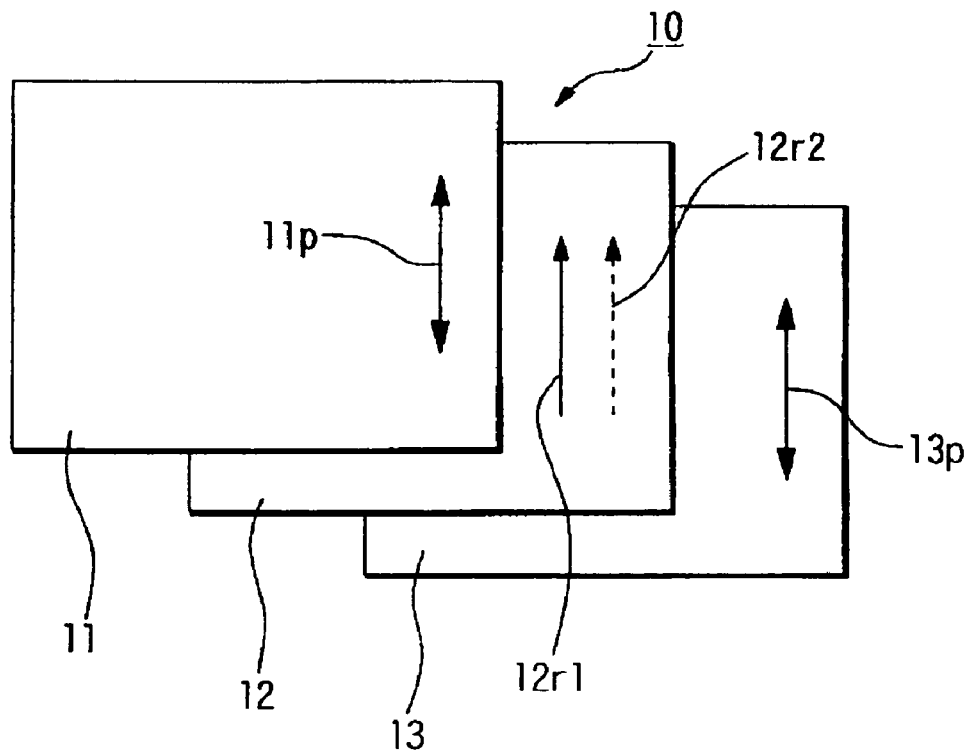
FIG. 2 is a structural diagram illustrating two-dimensionally the basic structure of the viewing angle control element according to the first embodiment.

FIG. 1(a) is a schematic sectional view illustrating the basic structure of a viewing angle control element according to the present invention, FIG. 1(b) is a schematic sectional view illustrating a structural example of the viewing angle control element according to the invention, and FIG. 2 is a structural diagram illustrating two-dimensionally the basic structure of the viewing angle control element according to the invention.

As shown in FIG. 1(a), a viewing angle control element 10 according to this embodiment has a basic structure comprising a pair of polarizing layers 11, 13 and a liquid crystal layer 12 interposed between the polarizing layers. Further, as shown in FIG. 2, transmission axes 11p, 13p of the polarizing layers 11, 13 are arranged to be parallel to each other, and the liquid crystal layer 12 includes liquid crystal twist-aligned by 180°. An aligned direction 12r1 of liquid crystal molecules adjacent to the polarizing layer 11 and the transmission axis 11p of the polarizing layer 11 are arranged to be parallel to each other, and an aligned direction 12r2 of liquid crystal molecules adjacent to the polarizing layer 13 and the transmission axis 13p of the polarizing layer 13 are parallel to each other. Furthermore, an aligned state of the liquid crystal layer 12 is electrically controllable, and can be shifted to another aligned state by applying an electric field to the liquid crystal layer 12 in the twist-aligned state.

The viewing angle control element 10 according to this embodiment can have a configuration, for example, shown in FIG. 1(b).

In the viewing angle control element 20 shown in FIG. 1(b), the liquid crystal layer 12 is interposed between a pair of substrates 24, 25 arranged to face each other, and polarizers (polarizing layers) 21, 23 are arranged on the outer surface sides of the substrates 24, 25. An electrode layer 26 as voltage applying device to the liquid crystal layer 12 and an alignment film 27 as alignment regulating means for regulating an initial alignment of the liquid crystal layer 12 are sequentially formed on the inner surface side (on the liquid crystal layer 12 side) of the substrate 24, and an electrode layer 28 as voltage applying means and an alignment film 29 as alignment regulating means are sequentially formed on the inner surface side (on the liquid crystal layer 12 side) of the substrate 25.

As the substrates 24, 25, light transmitted through substrate, such as glass or plastic, may be used, and the electrode layers 26, 28 may be made of transparent conductive materials such as ITO. The alignment films 27, 29 may be made of organic materials such as polyimide or inorganic materials such as silicon oxide. When the alignment films 27, 29 are made of polyimide films, their rubbing directions and the transmission axes of the polarizers 21, 23 are arranged to be parallel to each other.

The polarizers 21, 23 may be formed as polarizing layers on the inner surface side (on the liquid crystal layer 12 side) of the substrates 24, 25, and may be formed by using the polarizers 21, 23 as substrates.

In the viewing angle control element 20 having the above configuration, the liquid crystal layer 12 can be regulated into a twist-aligned state by 180° by the alignment films 27, 29, and by changing the aligned state of the liquid crystal layer 12 with a voltage applied between the electrode layers 26, 28, the viewing angle characteristic of transmitted light can be controlled.

The emission angle of the transmitted light can be controlled by the viewing angle control element 20 having the above configuration, and the verification result will be described below with reference to FIGS. 3 and 4.

Figure 3:
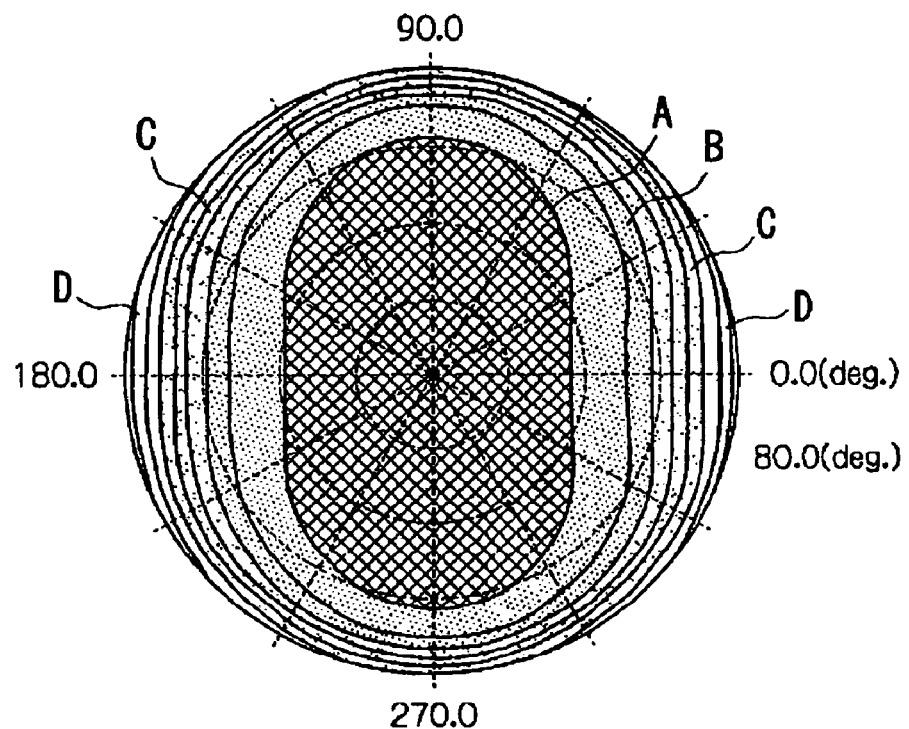
FIG. 3 is a diagram illustrating the transmissivity distribution of the viewing angle control element according to the first embodiment.
Figure 4:
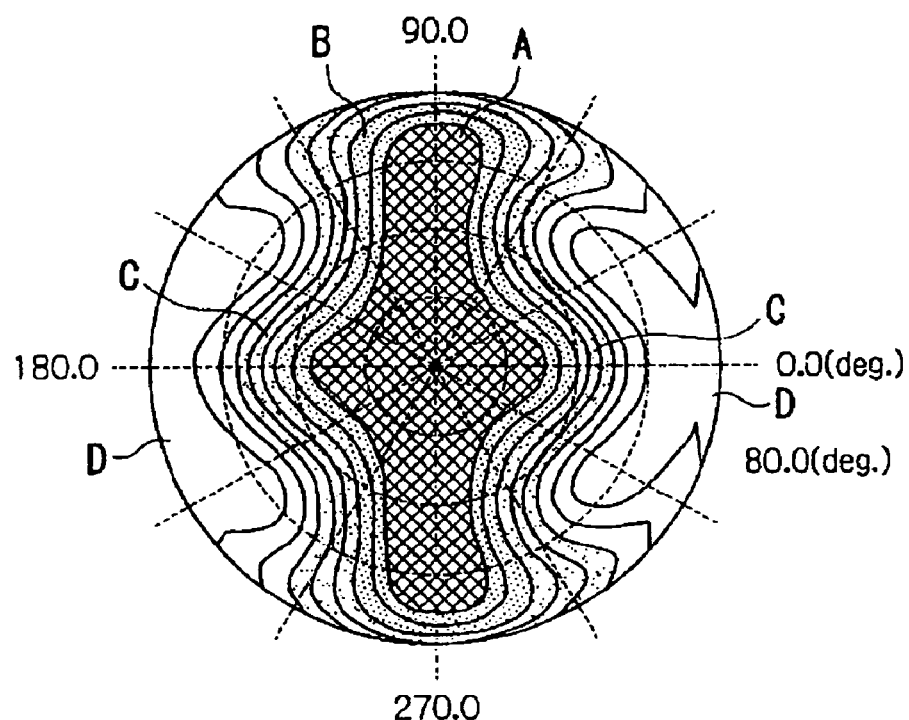
FIG. 4 is a diagram illustrating the transmissivity distribution of the viewing angle control element according to the first embodiment.

FIGS. 3 and 4 are a diagram illustrating transmissivity distribution of the viewing angle control element 20, the transmissivity being measured while changing the measuring angle.

As the measuring method, in a state where a planar light source is arranged on a back surface side (downside in the figure) of the viewing angle control element 20 shown in FIG. 1(b), a detector is arranged above the viewing angle control element 20, and the planar light source is turned on, the transmissivity of the viewing angle control element 20 was measured while changing the measuring angle of the detector (where a normal direction of the viewing angle control element 20 is supposed as 0°).

FIG. 3 shows the measurement result in a state where a voltage is not applied to the electrode layers 26, 28 shown in FIG. 1(b), and FIG. 4 shows the measurement result in a state where a voltage is applied to the electrode layers 26, 28 to align the liquid crystal molecules of the liquid crystal layer 12 to be substantially perpendicular to the substrates 24, 25. In FIGS. 3 and 4, areas denoted by a reference numeral A are areas having a highest transmissivity, and areas denoting by reference numerals B, C and D are areas having a lower transmissivity in that order.

As shown in FIG. 3, in the state where a voltage is not applied to the electrode layers 26, 28, a high transmissivity is obtained in all directions within a range of about 60° in an up-and-down direction and about 40° in a right-and-left direction from the front face of the viewing angle control element 20. In the state where a voltage is applied to the electrode layers as shown in FIG. 4, the transmissivity distribution in the up-and-down direction from the front is almost equal to FIG. 3, but the transmissivity of a large angle side in the right-and-left direction from the front is lower than the state shown in FIG. 3. From theses distribution diagrams, in the viewing angle control element 20 according to this embodiment, it can be seen that, by switching the voltage applying condition to the electrode layers 26, 28, the emission angle of the transmitted light in the right-and-left direction can be narrowed without damaging the brightness in the up-and-down direction from the front of the viewing angle control element 20.

As a result, according to the viewing angle control element of this embodiment, since the transmissivity distribution to the emission angle can be freely enlarged and lessened by an adjustment of the voltage applying condition to the liquid crystal layer, the range of viewing angle in which information is visible can be freely changed by displaying various information transmitted through the viewing angle control element, so that an observer can enjoy an excellent display while effectively concealing data from a third party.

Although it has been described in this embodiment that the transmission axes 11p, 13p of the polarizing layers 11, 13 and the aligned directions 12r1, 12r2 of the liquid crystal molecules of the liquid crystal layer adjacent to the polarizing layers are parallel to each other, the axes or the aligned directions in manufacturing the viewing angle control element may be deviated from the parallel arrangement only if practical problems do not occur. In other words, within a range where problems, such as remarkably damaging the controllability of transmissivity within the range of emission angle at the front of the device do not occur, arrangement between the transmission axes and the liquid crystal molecules can be adjusted. Specifically, practical problems do not occur if an angle that the transmission axis 11p and the aligned direction 12r1 of the liquid crystal molecules form and an angle that the transmission axis 13p and the aligned direction 12r2 of the liquid crystal molecules form fall within a range of ±5°. Furthermore, practical problems do not occur if the twist angle of the liquid crystal of the liquid crystal layer 12 falls within a range of 180°±10°.

Figure 5:
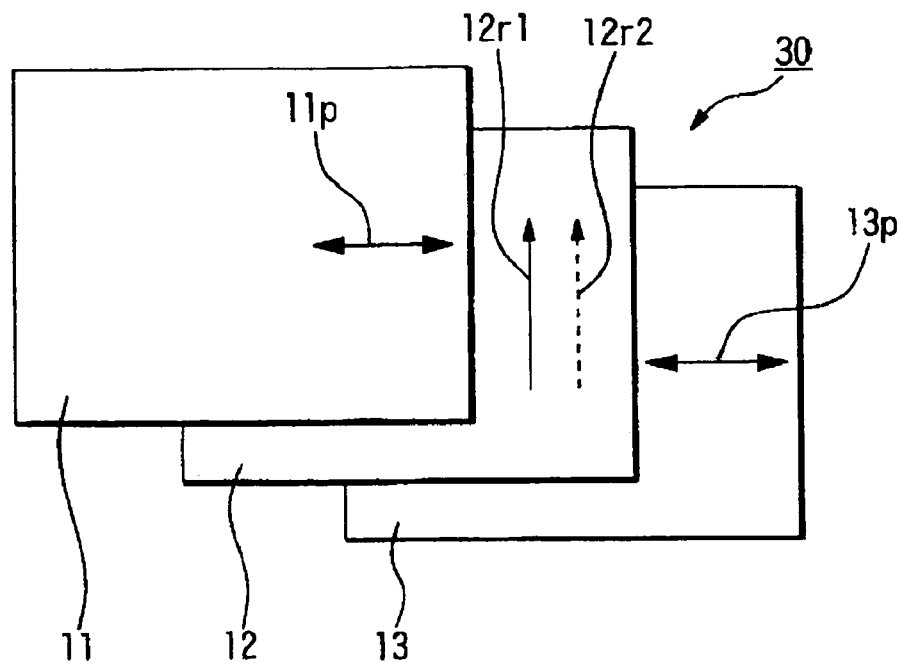
FIG. 5 is a structural diagram illustrating two-dimensionally a viewing angle control element according to a second embodiment.

Next, a second embodiment of the invention will be described with reference to FIGS. 5 to 7. FIG. 5 is a diagram illustrating a two-dimensional configuration of a viewing angle control element according to this embodiment. The basic structure of a viewing angle control element 30 according to this embodiment is similar to the viewing angle control element 10 according to the first embodiment shown in FIG. 1(a), where as shown in FIG. 5, the transmission axis 11p of the polarizing layer 11 and the transmission axis 13p of the polarizing layer 13 are arranged to be parallel to each other, and the aligned direction 12r1 of the liquid crystal molecules of the liquid crystal layer 12 adjacent to the polarizing layer 11 and the aligned direction 12r2 of the liquid crystal molecules adjacent to the polarizing layer 13 are arranged to be perpendicular to each other.

As a specific structural example of the viewing angle control element 30 according to this embodiment, the configuration shown in FIG. 1(b) can be applied. In other words, in the structural example shown in FIG. 1(b), by rotating the transmission axes of the polarizers 21, 23 by 90° from the arrangement of the first embodiment, the viewing angle control element having the basis structure shown in FIG. 5 can be obtained.

The inventor has measured the angle distribution of transmissivity of the viewing angle control element according to this embodiment, similarly to the first embodiment, and the measuring method is similar to the first embodiment. FIG. 6 shows the measurement result in a state where a voltage is not applied to the liquid crystal layer, and FIG. 7 shows the measurement result in a state where a voltage is applied to the liquid crystal layer (in a state where the liquid crystal molecules are aligned to be perpendicular to the polarizing layers 11, 13).

Figure 6:
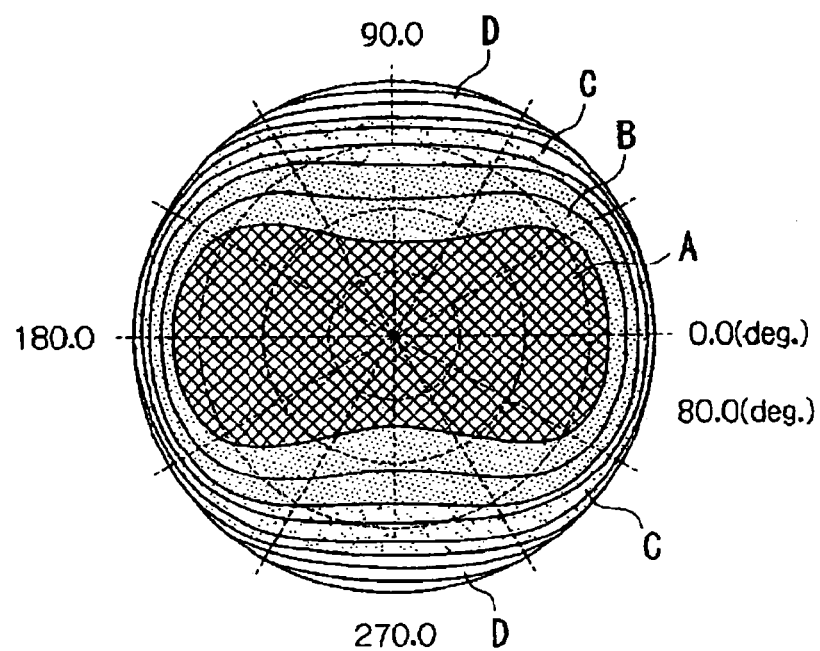
FIG. 6 is a diagram illustrating the transmissivity distribution of the viewing angle control element according to the second embodiment.
Figure 7:
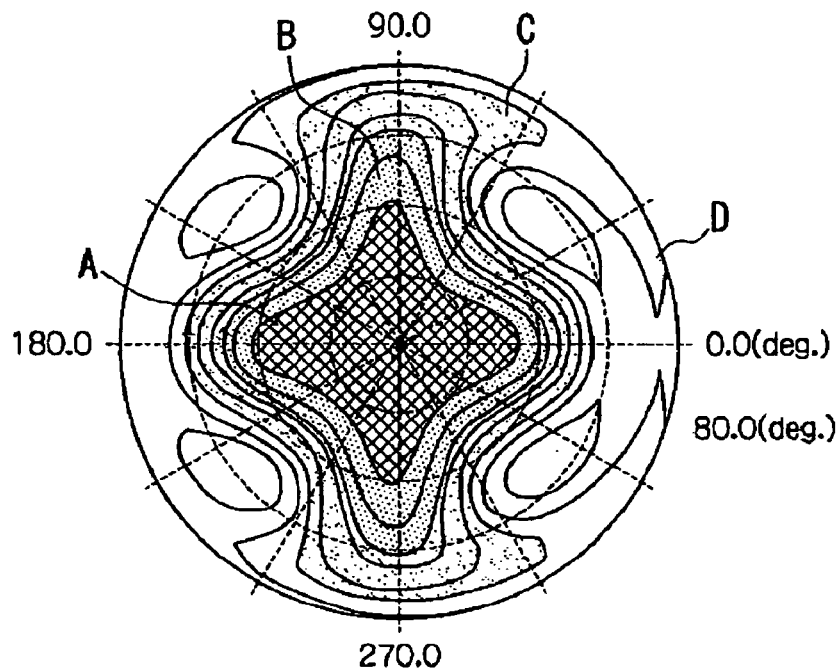
FIG. 7 is a diagram illustrating the transmissivity distribution of the viewing angle control element according to the second embodiment.

As seen from the areas A to D shown in FIGS. 6 and 7, even in a case where the polarizing layers 11, 13 are arranged to be parallel to a retardation axis of the adjacent liquid crystal molecules, in a state where a voltage is not applied to the liquid crystal layer, with respect to the distribution of the emission angle of the transmitted light, the area A with a high transmissivity occupies a wide range of angle similarly to the distribution shown in FIG. 3, and in a state where a voltage is applied to the liquid crystal layer shown in FIG. 7, the area A with a high transmissivity is narrowed remarkably compared with the distribution shown in FIG. 6. Therefore, it is possible to freely enlarge and lessen the range of viewing angle of the transmitted light by the viewing angle control element having the configuration according to this embodiment.

Figure 8:
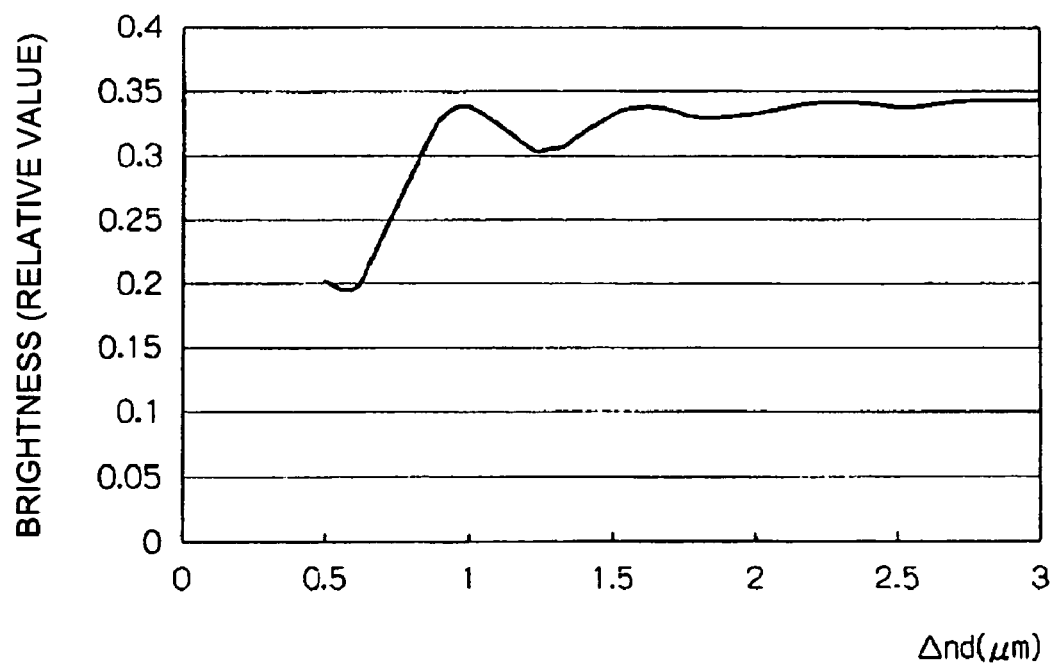
FIG. 8 is a graph illustrating the dependence of brightness of a viewing angle control element according to a third embodiment on Δnd.

In order to optimize the display brightness (transmissivity) as seen from the front side in the viewing angle control element 20 according to the above embodiment, the inventor has measured the transmissivity at the front side of the viewing angle control element 20 while changing the retardation $\Delta nd$ of the liquid crystal constituting the liquid crystal layer 12 of the viewing angle control element 20. FIG. 8 is a graph illustrating the measurement result, where an axis of abscissa expresses $\Delta nd$ μm and an axis of ordinate expresses brightness (transmissivity). As shown in FIG. 8, the brightness at the front side of the viewing angle control element 20 is gradually increased while repeating periodical up and down movement with respect to $\Delta nd$. Then in the figure, when $\Delta nd$ is 1 or more, it can be seen that the sufficient brightness is obtained at the front side of the viewing angle control element. When $\Delta nd$ is 2 or more, the brightness is not almost changed with change of $\Delta nd$, so that $\Delta nd$ of 2 or more is preferable in view of stability of brightness as seen from at the front side.

Furthermore, a change of the aforementioned viewing angle restriction effect (an effect of narrowing the viewing angle by application of a voltage to the liquid crystal layer 12) can be verified by changing $\Delta nd$ of the liquid crystal layer 12.

Figure 9:
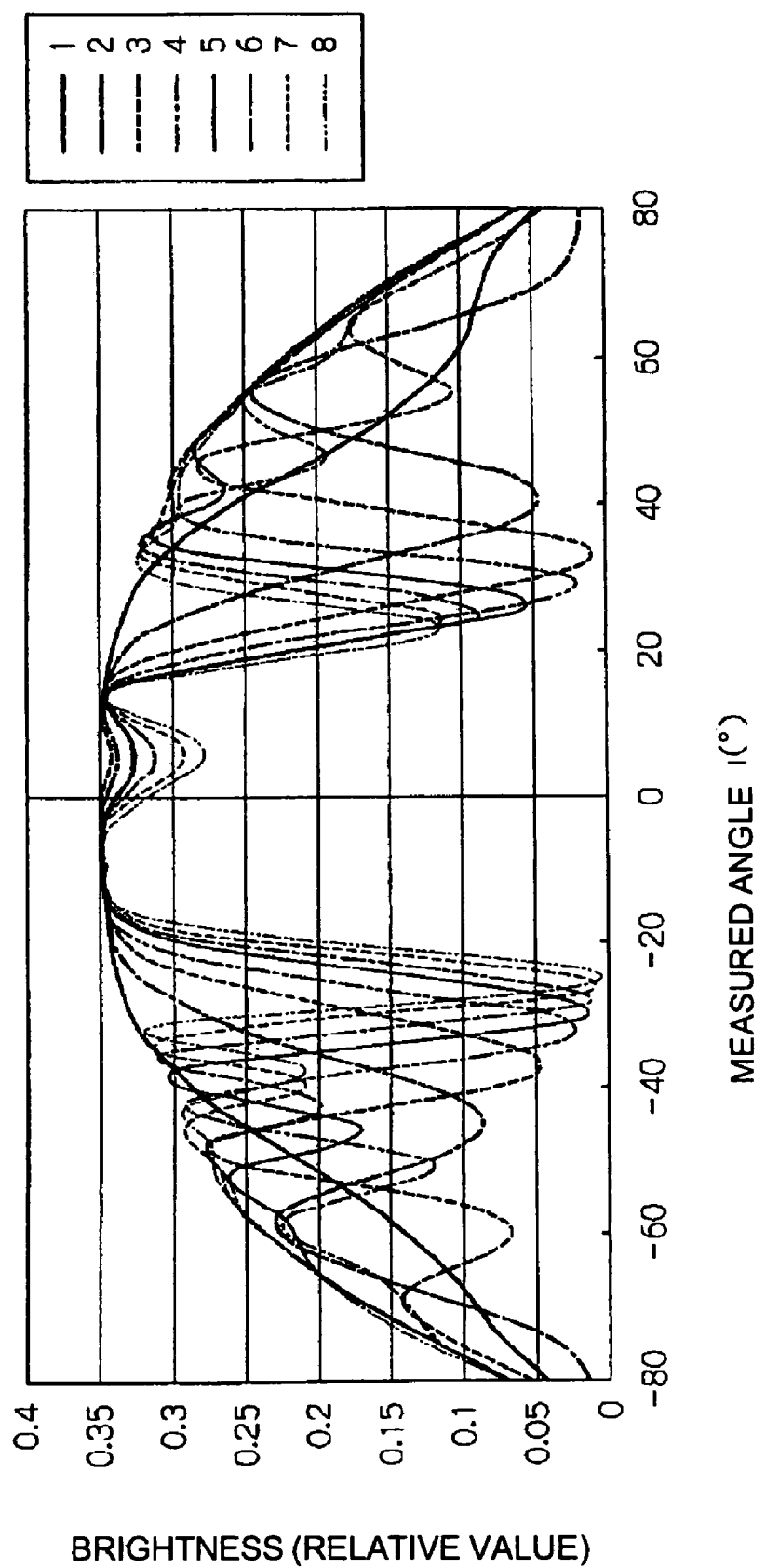
FIG. 9 is a graph illustrating the dependence of the transmissivity distribution of the viewing angle control element according to the third embodiment on Δnd.

FIG. 9 is a graph illustrating a result of measuring the brightness (transmissivity) in the right-and-left direction from the front side of the viewing angle control element 20 in cases of eight kinds of liquid crystal layers 12 of which $\Delta nd$ is 1.0 μm to 8.0 μm, where the axis of abscissa expresses the measuring angle in the right-and-left direction from the front side of the viewing angle control element 20 and the axis of ordinate expresses the brightness (transmissivity). A voltage of 7V is applied to the liquid crystal layer 12 in measurement. As shown in FIG. 9, in the viewing angle control element 20 according to the invention, the larger $\Delta nd$ of the liquid crystal layer 12 becomes, the narrower the bright range of angle becomes, so that the viewing angle restriction effect is enhanced. On the other hand, the symmetry of the brightness (about 0°) tends to be damaged with increase of Δnd, and the brightness is enhanced specifically in the vicinity of 20° to 30° in the positive viewing angle. Therefore, the range of Δnd where a sufficient viewing angle can be secured in restricting the viewing angle is 8.0 μm or less, and the range of Δnd where the symmetry of brightness can be also obtained is 5.0 μm or less.

Further, the asymmetry of brightness is generated because the amount of alignment change with respect to application of a voltage to the liquid crystal layer 12 is decreased with increase of Δnd of the liquid crystal layer 12. Therefore, in a case where it is not necessary to consider power consumption of the viewing angle control element 20, by applying a higher voltage to the liquid crystal layer 12 to secure the symmetry of brightness, it is possible to obtain an excellent viewing angle restriction effect even when the liquid crystal having Δnd of 5 μm or more is used.

Figure 10:
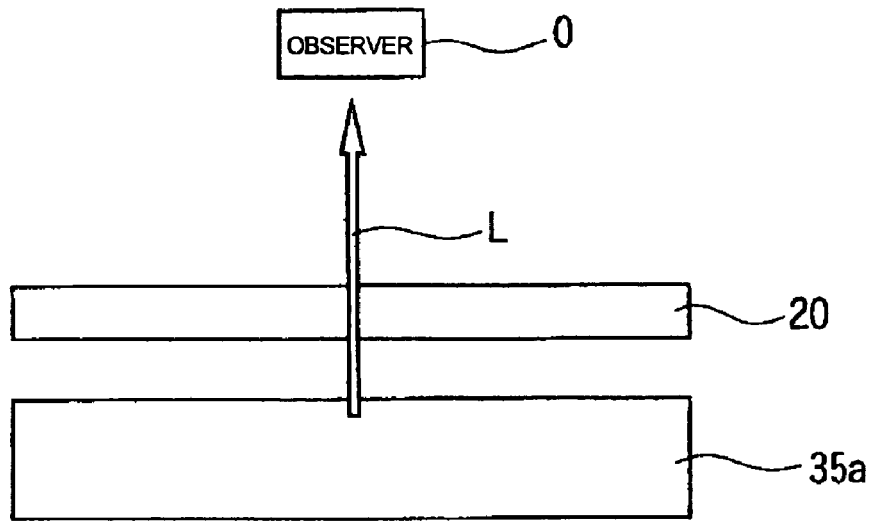
FIG. 10 is a structural diagram illustrating a display device according to a fourth embodiment.
Figure 11:
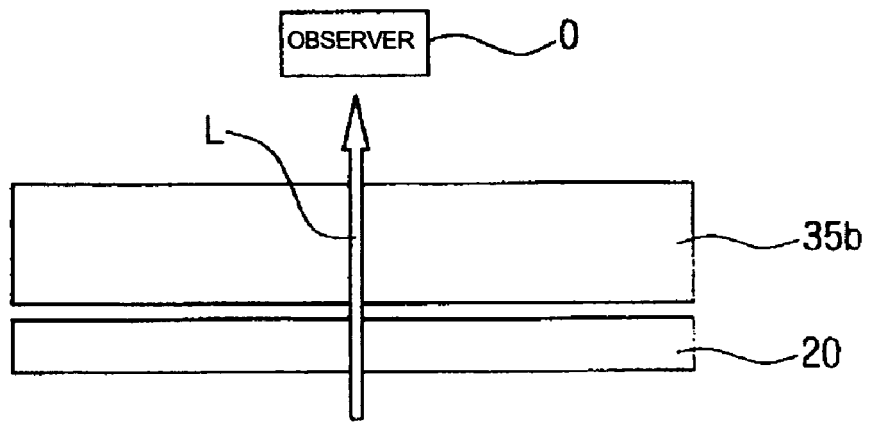
FIG. 11 is a structural diagram illustrating the display device according to the fourth embodiment.

Next, a fourth embodiment of the invention will be described with reference to FIGS. 10 and 11. FIGS. 10 and 11 are schematic structural diagrams illustrating a display device comprising the viewing angle control element 20 according the aforementioned embodiment, where FIG. 10 shows an example where the viewing angle control element 20 is provided at the front surface side (an observer O side) of the display element 35a, and FIG. 11 shows an example where the viewing angle control element 20 is provided at the back surface side (a side opposite to an observer O) of the display element 35b.

First, in the display device shown in FIG. 10, a display is carried out on the observer O by allowing the display light L of the display element 35a to be transmitted through the viewing angle control element 20. Then, by electrically controlling the liquid crystal layer 12 of the viewing angle control element 20 according to the aforementioned embodiment, the emission angle (that is, viewing angle) of the display light L can be freely increased and decreased. Therefore, according to the display device of this embodiment, in a state where the viewing angle of the display light L is narrowed by the viewing angle control element 20, the concealment of displayed information from a third party can be very easily performed, and in the situation requiring the concealment of information, an excellent visibility is obtained by not allowing the viewing angle control to be performed by means of the viewing angle control element 20.

As the display element 35a, a light-emission type display element, such as a cathode ray tube (CRT) display element, an electroluminescent (EL) display element, or a plasma display panel (PDP), or a light shutter type display element such as a liquid crystal display element can be used. As shown in FIG. 10, in a case where the viewing angle control element 20 is provided on the front surface of the display element 35a, it is specifically effective that the light-emission type display element or the liquid crystal display element with a wide viewing angle is used as the display element 35a.

Next, in the display device shown in FIG. 11, by allowing the light supplied from a light source, etc. to be incident on the display element 35b after the viewing angle is controlled by the viewing angle control element 20 in advance, the display is carried out on the observer O. In this embodiment, the light-shutter type display element, such as a liquid crystal display element, is used as the display element 35b. In this configuration, the display element 35b is arranged at the first front surface as seen from the observer O, so that it is possible to obtain a clear display without parallax.

Figure 12:
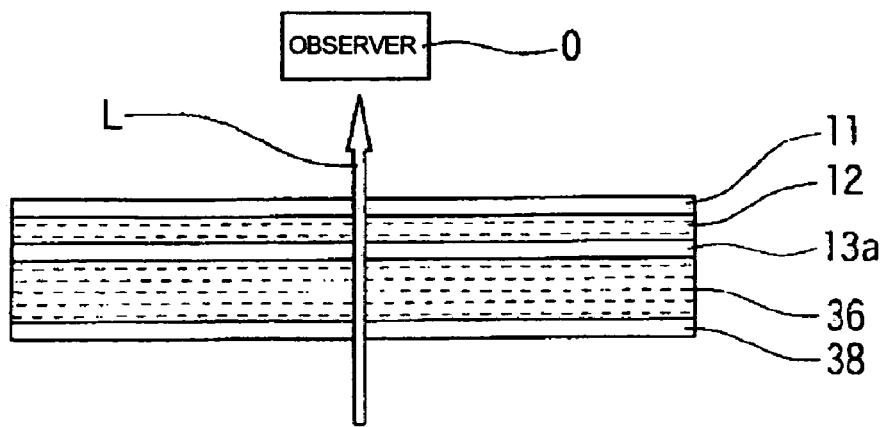
FIG. 12 is a structural diagram illustrating a display device according to a fifth embodiment.

Next, a fifth embodiment of the invention will be described with reference to FIGS. 12 and 13. A display device shown in FIG. 12 has a structure obtained by sequentially laminating a polarizing layer 11, a liquid crystal layer 12, a polarizing layer 13a, a liquid crystal layer 36 and a polarizing layer 38 from the upside of the figure. In other words, the polarizing layers 11, 13a and the liquid crystal layer 12 interposed therebetween at the upside of the figure constitute a viewing angle control element having the same function as the viewing angle control element 10 according to the first embodiment, and the polarizing layers 13a, 38 and the liquid crystal layer 36 interposed therebetween at the downside of the figure constitute a liquid crystal display element. Therefore, the viewing angle control element and the liquid crystal display element share the polarizing layer 13a. In this embodiment, the liquid crystal display element is schematically described as having only the liquid crystal layer 36 and the polarizing layers 38, 13a for interposing the liquid crystal layer therebetween, but actually, it is needless to say that the liquid crystal display element can further include alignment films or electrodes for driving and controlling alignment of the liquid crystal, phase difference layers, and the like.

The display device having the aforementioned configuration modulates the light L of a light source, etc. incident from the downside of the figure (from the outer surface side of the polarizing layer 38) by the liquid crystal layer 36 to generate the display light forming an image, and then controls the emission angle (viewing angle) of the display light incident on the liquid crystal layer 12. Accordingly, compared with a case where a display device is constructed by laminating the viewing angle control element and the liquid crystal display element individually prepared, it is possible to realize decrease of the thickness of the display device and reduction of the number of components, and it is also possible to suppress attenuation of the display light due to transmission through the polarizing layer, so that it is possible to provide a bright and thin display device at low cost.

Figure 13:
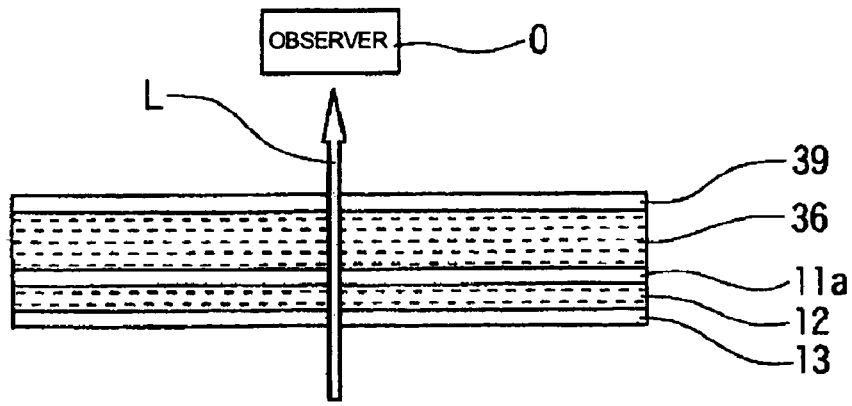
FIG. 13 is a structural diagram illustrating the display device according to the fifth embodiment.

Next, the display device shown in FIG. 13 has a structure where a polarizing layer 39, a liquid crystal layer 36, a polarizing layer 11a, a liquid crystal layer 12 and a polarizing layer 13 are sequentially laminated from the upside of the figure. In other words, the polarizing layers 11a, 13 at the downside of the figure and the liquid crystal layer 12 interposed therebetween constitute a viewing angle control element having the same function as the viewing angle control element 10 according to the aforementioned first embodiment, and the polarizing layers 39 at the upside of the figure, the polarizing layer 11a and the liquid crystal layer 36 interposed therebetween constitute a liquid crystal display element. Therefore, the liquid crystal display element and the viewing angle control element share the polarizing layer 11a. Furthermore, in this embodiment, the liquid crystal display element is schematically described as comprising only the liquid crystal layer 36 and the polarizing layers 11a, 39 for interposing the liquid crystal layer therebetween, but actually, it is needless to say that the liquid crystal display element further comprises alignment films or electrodes for driving and controlling the alignment of the liquid crystal, phase difference plates, and the like.

The display device having the above configuration first controls the emission angle (viewing angle) by the liquid crystal layer 12, then allows the light L of a light source, etc. incident from the downside of the figure (from the outer surface side of the polarizing layer 13) to be incident on the liquid crystal layer 36, modulates the light by means of the liquid crystal layer 36 to generate the display light, and then performs the display to an observer O. Accordingly, compared with a case where a display device is constructed by laminating the viewing angle control element and the liquid crystal display element individually prepared, it is possible to realize decrease of the thickness of the display device and reduction of the number of components, and it is also possible to suppress attenuation of the display light due to transmission through the polarizing layer, so that it is possible to provide a bright and thin display device at low cost.

Figure 14:
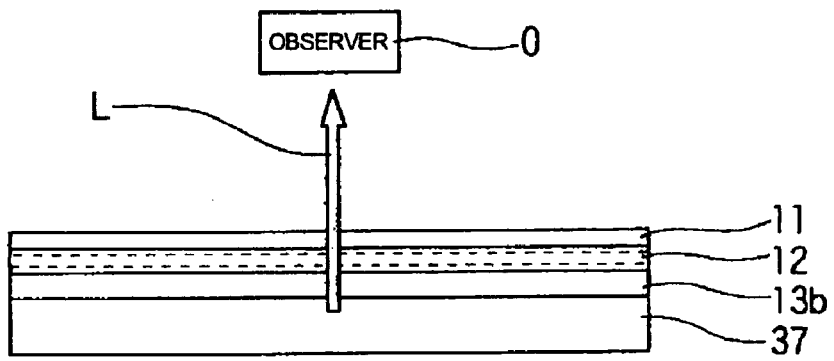
FIG. 14 is a structural diagram illustrating a display device according to a sixth embodiment.

Next, a sixth embodiment of the invention will be described with reference to FIG. 14. The display device according to this embodiment of which the sectional structure is shown in FIG. 14 comprises an EL display element as the display element 37, and has a structure where a viewing angle control element obtained by laminating a circularly polarizing layer 13b, the liquid crystal layer 12 and the polarizing layer 11 is provided on the EL display element 37. The viewing angle control element provided on the EL display element 37 has the same function as the viewing angle control element 10 according to the first embodiment, except that the circularly polarizing layer 13b is provided on one side surface of the viewing angle control element. By allowing the display light L from the EL display element 37 to be incident on the viewing angle control element, controlling the viewing angle by means of the viewing angle control element, and then allowing the display light to reach the observer O, the display is carried out.

In the display device having the aforementioned configuration, the circularly polarizing layer 13b interposed between the EL display element 37 and the liquid crystal layer 12 functions to remove a specular effect of the EL display element, and thus the visibility of the display device can be improved. As the circularly polarizing layer 13b, for example, an optical film obtained by laminating a phase difference layer and a polarizing layer can be used. In this configuration, the phase difference layer is provided on the EL display element 37 side, and the polarizing layer is provided on the liquid crystal layer 12 side.

Figure 15:
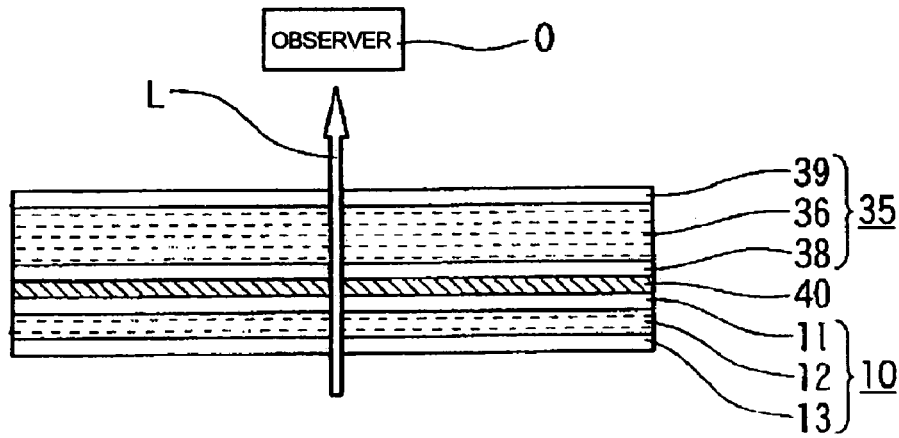
FIG. 15 is a structural diagram illustrating a display device according to a seventh embodiment.

Next, a seventh embodiment of the invention will be described with reference to FIGS. 15 to 17. In the display device according to this embodiment of which the sectional structure is shown in FIG. 15, the viewing angle control element 10 including the polarizing layers 11, 13 and the liquid crystal layer 12 interposed therebetween, and a liquid crystal display element 35 having the polarizing layers 38, 39 and a liquid crystal layer 36 interposed therebetween are laminated with an optical rotation element (optical rotation means) 40 therebetween. In the display device according to this embodiment, the viewing angle is controlled by the viewing angle control element 10, and then the light L of a light source, etc. incident on the viewing angle control element 10 is allowed to be incident on the optical rotation element 40. Then, in a state where a polarized direction of the light L is rotated by the optical rotation element 40, and thus the transmission axis of the polarizing layer 38 of the liquid crystal display element 35 and the polarized direction are allowed to coincide with each other, the light is allowed to be incident on the liquid crystal display element 35.

Therefore, in the display device according to this embodiment, since absorption by the polarizing layer 38 does not occur when the light L passing through the viewing angle control element 10 is allowed to be incident on the liquid crystal display element 35, it is possible to realize a bright display.

In the display device according to this embodiment, a direction of the transmission axis of the polarizing layer of the viewing angle control element 10 can be set to any direction without depending upon the direction of the transmission axis of the liquid crystal display element 35. Therefore, even if the arrangement of the polarizing layers 38, 39 of the liquid crystal display element 35 is set to the direction where a high contrast display is obtained, the directions of the polarizing layers 11, 13 of the viewing angle control element 10 for controlling the viewing angle can be set to a direction in which the viewing angle is properly controlled, so that it is possible to allow the high quality display to be compatible with the excellent viewing angle control function.

Although a case where the viewing angle control element 10 is arranged at the back surface side of the liquid crystal display element 35 as seen from the observer O has been described in this embodiment, the positional relation of the viewing angle control element 10 and the liquid crystal display element 35 may be inverted. In order to obtain clearer display, it is preferable that as in this embodiment, the liquid crystal display element 35 is arranged at the observer O side, but since the viewing angle control by the viewing angle control element 10 is carried out prior to the optical modulation by the liquid crystal display element 35, the display at a high angle side can become a little dark. Therefore, it is preferable that arrangement of the liquid crystal display element 35 and the viewing angle control element 10 is determined in consideration of brightness and clearness of the display. Now, differences in viewing angle characteristics based on the arrangement will be described with reference to the drawings.

Figure 16:
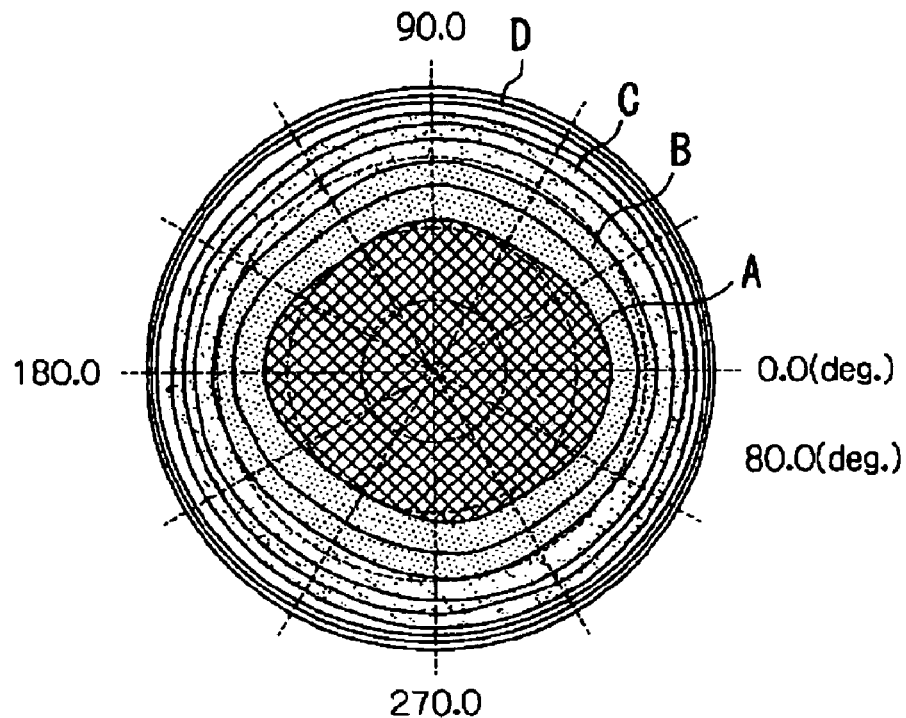
FIG. 16 is a diagram illustrating the transmissivity distribution of the display device according to the seventh embodiment.
Figure 17:
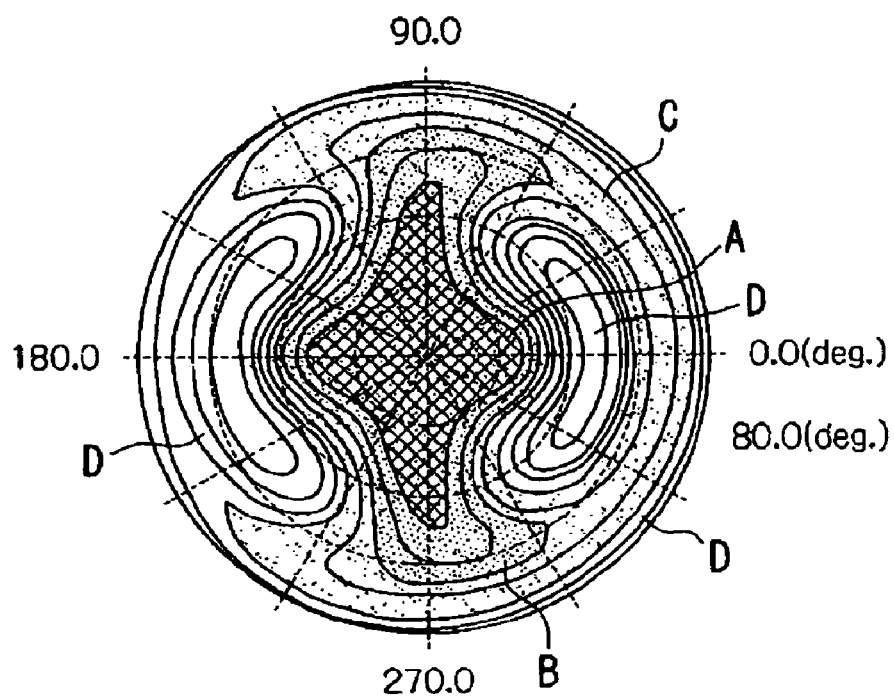
FIG. 17 is a diagram illustrating the transmissivity distribution of the display device according to the seventh embodiment.

FIGS. 16 and 17 are diagrams illustrating transmissivity distribution of the display device according to this embodiment, where the transmissivity has been measured while changing the measurement angle. The measuring method is similar to the first embodiment. FIG. 16 shows a measurement result in a state where a voltage is not applied to the liquid crystal layer 12, and FIG. 17 shows a measurement result in a state where a voltage is applied to the liquid crystal layer 12. As shown in the figures, in the display device according to this embodiment, switching of the display to a wide viewing angle or a narrow viewing angle can be also easily carried out by switching the voltage applying condition to the liquid crystal layer 12.

On the contrary, in a case where the viewing angle control element 10 is arranged at a front surface side (the observer O side) of the liquid crystal display element 35, the viewing angle characteristic as shown in FIGS. 3 and 4 is obtained. Therefore, if comparing FIG. 16 with FIG. 3, in a state where a voltage is not applied, a bright display is obtained with a wider range of viewing angle by arranging the viewing angle control element 10 at the front surface side of the liquid crystal display element 35. However, by arranging the viewing angle control element 10 at the front surface side, the clearness of the display is deteriorated.

As the optical rotation element 40 according to this embodiment, for example, a phase difference film having an in-plane phase difference or a half-wave plate comprising a laminated structure of the phase difference film may be used.

The optical rotation element 40 may include liquid crystal having a twist structure of the element in its thickness direction. In this case, the twist angle of the twist structure is an angle which the optical axis direction of the polarizing layer 11 of the viewing angle control element 10 and the optical axis direction of the polarizing layer 38 of the liquid crystal display element 35 form, and $\Delta nd$ (μm) of the liquid crystal is larger than 1/200 of an angle which the optical axes of the polarizing layers 11, 38 form.

Figure 19:
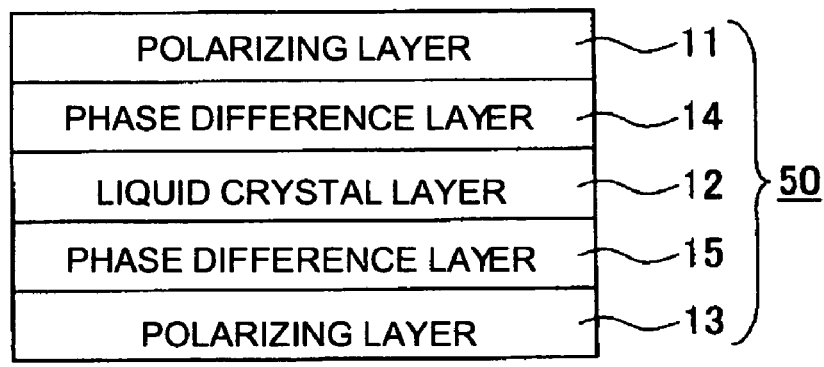
FIG. 19 is a structural diagram illustrating a display device according to an eighth embodiment.

Next, an eighth embodiment of the invention will be described with reference to FIGS. 19 to 21. A viewing angle control element according to this embodiment of which the sectional structure is shown in FIG. 19 comprises polarizing layers 11, 13 and phase difference layers 14, 15 and the liquid crystal layer 12 interposed therebetween, and can be arranged, for example, at the front surface side of the liquid crystal display element 20, similarly to the aforementioned embodiment. The liquid crystal layer 12 can include a liquid crystal twist-aligned by 180°, and the transmission axes of the polarizing layers 11, 13 are parallel to each other. The liquid crystal molecules of the liquid crystal layer 12 on the polarizing layer 11 side are arranged to be parallel to the transmission axis of the polarizing layer 11, and the liquid crystal molecules on the polarizing layer 13 are arranged to be parallel to the transmission axis of the polarizing layer 13. In other words, the viewing angle control element 50 according to this embodiment has a configuration similar to the viewing angle control element according to the first embodiment, except that the phase difference layers 14, 15 are provided.

It is preferable that, as the phase difference layers 14, 15, phase difference films (phase difference films having an optical axis in its thickness direction, that is, so-called C plates) which have retardation not in its in-plane direction but only in its thickness direction, and of which a refractive index in the thickness direction is smaller than a refractive index in the in-plane direction are used. Specifically expressing the refractive index of the phase difference layer in its thickness direction, when the refractive indexes in the in-plane direction of the phase difference film are nx and ny, and the refractive index in the thickness (vertical) direction is nz, the retardation of the phase difference film in its thickness direction is $d \times ((nx+ny)/2 - nz)$, where d is thickness. By using such phase difference film, the alignment of the optical axes with the polarizing layers 11, 13 is not necessary, so that it is possible to improve facility of manufacture.

In this embodiment, in a preferable arrangement of the phase difference layers 14, 15, the phase difference layers 14, 15 are arranged on both sides of the liquid crystal layer 12, but it should be understood that the arrangement is not limited thereto. In other words, a single phase-difference layer 14 may be provided between the liquid crystal layer 12 and the polarizing layer 11, and the two phase-difference layers 14, 15 are superposed and arranged between the liquid crystal layer 12 and the polarizing layer 11. By using two or more phase difference layers, it is possible to enlarge a viewing angle restriction range, and the in-plane phase difference can be cancelled each other to improve the symmetry of the viewing angle characteristic. A structure where three or more phase difference layers are provided may be applied as needed.

In the viewing angle control element 50 according to this embodiment having the aforementioned configuration, by providing the phase difference layers 14, 15, it is specifically possible to narrow the range of viewing angle in restricting the viewing angle.

Figure 20:
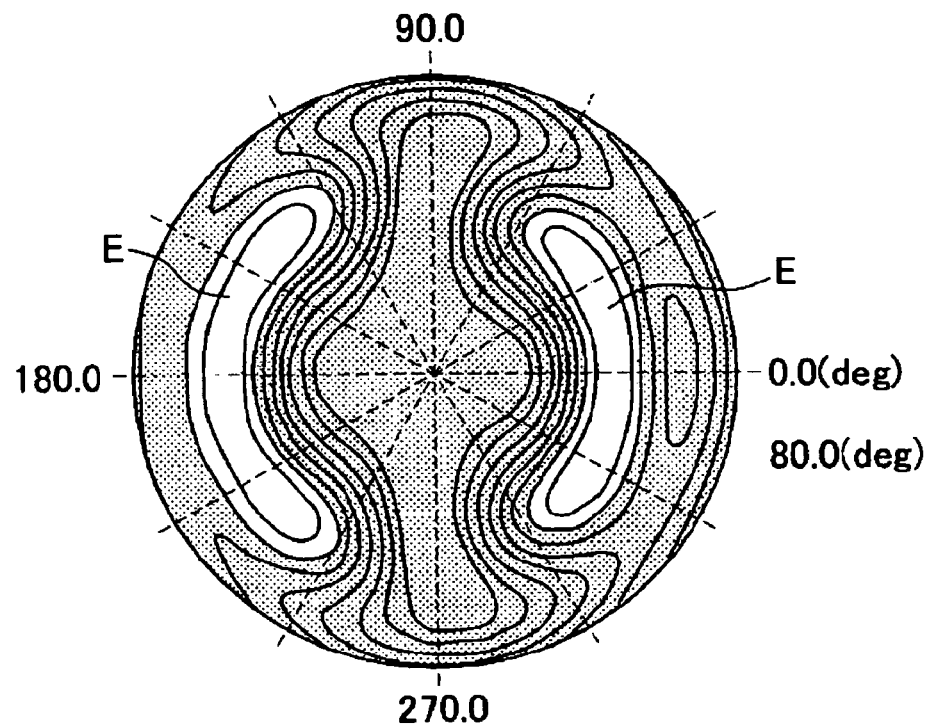
FIG. 20 is a diagram illustrating the transmissivity distribution of the display device according to the eighth embodiment.
Figure 21:
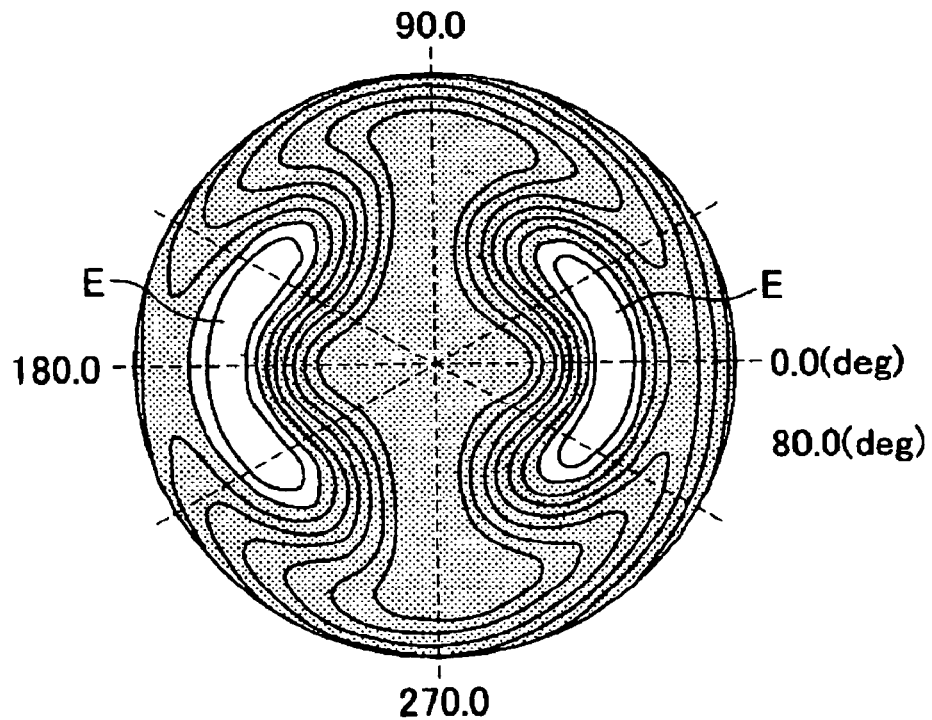
FIG. 21 is a diagram illustrating the transmissivity distribution of the display device (Δnd=2.0) according to the first embodiment.

FIG. 20 is a diagram illustrating the transmissivity distribution in a state where the viewing angle control element 50 according to this embodiment is arranged at the front surface side of the liquid crystal display element 20, and FIG. 21 is a diagram illustrating the transmissivity distribution in a case where Δnd of the liquid crystal layer of the viewing angle control element 10 according to the first embodiment is set to 2.0 for the purpose of comparison. The white area denoted by a reference numeral E in FIGS. 20 and 21 is an area where the transmissivity (brightness) is 10% or less of the transmissivity in the front direction (the center of the distribution diagram), and thus in this area E, the display of the liquid crystal display element 20 at the back side is dark enough not to almost recognize.

The method of measuring the transmissivity distributions shown in FIGS. 20 and 21 is similar to the first embodiment, and the phase difference layers 14, 15 used for the measurement are C plates having a phase difference of 200 nm in its thickness direction. As apparent from the comparison of the two transmissivity distributions, the display device including the viewing angle control element 50 (FIG. 20) having the phase difference layers 14, 15 at the inside of the polarizing layers 11, 12 has the area E wider than the display device comprising the viewing angle control element 10 according to the above embodiment, so that it is possible to conceal the display with a wider range of viewing angle and have excellent viewing angle controllability.

Figure 18:
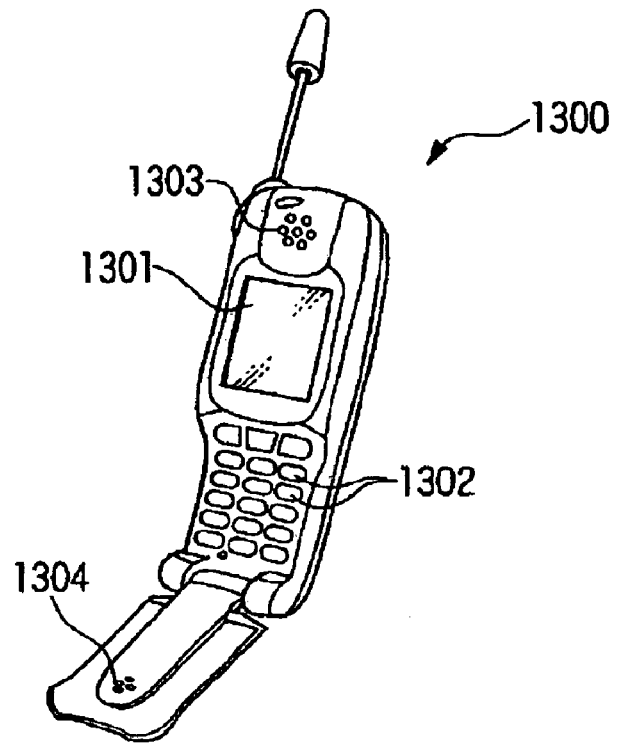
FIG. 18 is a perspective view illustrating an example of an electronic apparatus according to the present invention.

FIG. 18 is a perspective view illustrating an example of an electronic apparatus according to the invention. A mobile phone 1300 shown in the figure has the display device according to the invention as a small-sized display unit 1301, and comprises a plurality of manipulation buttons 1302, an earpiece 1303 and a mouthpiece 1304.

It should be understood that the display devices according to the aforementioned embodiments are not limited to the mobile phone, but can be suitably used as image display devices of an electronic book, a personal computer, a digital still camera, a liquid crystal television, a view finder type or monitor direct vision-type video tape recorder, a car navigation apparatus, a pager, an electronic note, an electronic calculator, a word processor, a work station, a television phone, a POS terminal, an apparatus including a touch panel, and the like. The display devices can very easily perform the switching between the wide viewing angle and the narrow viewing angle in any electronic apparatus, has an excellent concealment property of information, and enables a display with a high quality.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A viewing angle control element, comprising:
   a pair of polarizing layers having transmission axes arranged to be substantially parallel to each other; and
   a liquid crystal layer disposed between the pair of polarizing layers, wherein liquid crystal molecules adjacent to one polarizing layer and liquid crystal molecules adjacent to the other polarizing layer are aligned to be substantially parallel to the transmission axis of the nearest polarizing layer; and
   electrodes for applying voltage to the liquid crystal layer, the liquid crystal molecules having a first alignment state when voltage is applied to the liquid crystal layer by the electrodes and a second alignment state when voltage is not applied to the liquid crystal layer by the electrodes.

2. The viewing angle control element according to claim 1, the liquid crystal layer including liquid crystal twist-aligned by approximately 180°, and
   liquid crystal molecules adjacent to the polarizing layers being aligned to be substantially parallel to the optical axes of the polarizing layers.

3. The viewing angle control element according to claim 1, an alignment axis of the liquid crystal layer and absorption axes of the polarizing layers being arranged to be substantially perpendicular to each other.

4. The viewing angle control element according to claim 1, product Δnd of the refractive-index anisotropy Δn of the liquid crystal layer and a thickness d of the liquid crystal layer being equal to or greater than 1.0 μm.

5. The viewing angle control element according to claim 1, product Δnd of the refractive-index anisotropy Δn of the liquid crystal layer and a thickness d of the liquid crystal layer being equal to or less than 8.0 μm.

6. The viewing angle control element according to claim 1, product Δnd of the refractive-index anisotropy Δn of the liquid crystal layer and a thickness d of the liquid crystal layer being equal to or greater than 2.0 μm, and equal to or less than 5.0 μm.

7. The viewing angle control element according to claim 1, a phase difference layer being provided between the pair of polarizing layers.

8. The viewing angle control element according to claim 7, the phase difference layer being provided at both sides of the liquid crystal layer.

9. The viewing angle control element according to claim 7, the phase difference layer having an optical characteristic of giving a phase difference to a component of light transmitted through the phase difference layer in a direction of thickness.

10. A display device, comprising the viewing angle control element according to claim 1 and a display element, the viewing angle control element adjusting the viewing angle of the display element.

11. A display device according to claim 10, the display element including a liquid crystal display element, and the viewing angle control element being provided on a front surface or a back surface of the liquid crystal display element.

12. A display device according to claim 11, the polarizing layer of the viewing angle control element on the liquid crystal display element side functioning as a polarizing layer of the liquid crystal display element.

13. A display device according to claim 11, an optical rotation device that adjusts a deviation between an optical axis of a polarizing layer provided on a viewing angle control element forming surface of the liquid crystal display element and the optical axes of the polarizing layers of the viewing angle control element being provided between the liquid crystal display element and the viewing angle control element.

14. A display device according to claim 13, the optical rotation device having twist-aligned liquid crystal.

15. A display device according to claim 10, the display element including an EL display element, a circularly polarizing layer being provided between the EL display element and the viewing angle control element, and the polarizing layer of the viewing angle control element on an EL display element side constituting a part of the circularly polarizing layer.

16. An electronic apparatus, comprising the viewing angle control element according to claim 1.

17. An electronic apparatus, comprising the display device according to claim 10.

18. The viewing angle control element according to claim 1, wherein one of the polarizing layers is shared with a liquid crystal display unit.

19. A viewing angle control element, comprising:
a pair of polarizing layers having transmission axes arranged to be substantially parallel to each other; and
a liquid crystal layer disposed between the pair of polarizing layers, wherein liquid crystal molecules adjacent to one polarizing layer and liquid crystal molecules adjacent to the other polarizing layer are aligned to be substantially perpendicular to the transmission axis of the nearest polarizing layer; and
electrodes for applying voltage to the liquid crystal layer, the liquid crystal molecules having a first alignment state when voltage is applied to the liquid crystal layer by the electrodes and a second alignment state when voltage is not applied to the liquid crystal layer by the electrodes.

20. The viewing angle control element according to claim 19, an alignment axis of the liquid crystal layer and absorption axes of the polarizing layers being arranged to be substantially parallel to each other.

21. The viewing angle control element according to claim 19, product Δnd of the refractive-index anisotropy Δn of the liquid crystal layer and a thickness d of the liquid crystal layer being equal to or greater than 1.0 μm.

22. The viewing angle control element according to claim 19, product Δnd of the refractive-index anisotropy Δn of the liquid crystal layer and a thickness d of the liquid crystal layer being equal to or less than 8.0 μm.

23. The viewing angle control element according to claim 19, product Δnd of the refractive-index anisotropy Δn of the liquid crystal layer and a thickness d of the liquid crystal layer being equal to or greater than 2.0 μm, and equal to or less than 5.0 μm.

24. The viewing angle control element according to claim 19, a phase difference layer being provided between the pair of polarizing layers.

25. The viewing angle control element according to claim 24, the phase difference layer being provided at both sides of the liquid crystal layer.

26. The viewing angle control element according to claim 24, the phase difference layer having an optical characteristic of giving a phase difference to a component of light transmitted through the phase difference layer in a direction of thickness.

27. A display device, comprising the viewing angle control element according to claim 19 and a display element, the viewing angle control element adjusting the viewing angle of the display element.

28. A display device according to claim 27, the display element including a liquid crystal display element, and the viewing angle control element being provided on a front surface or a back surface of the liquid crystal display element.

29. A display device according to claim 28, the polarizing layer of the viewing angle control element on the liquid crystal display element side functioning as a polarizing layer of the liquid crystal display element.

30. A display device according to claim 28, an optical rotation device that adjusts a deviation between an optical axis of a polarizing layer provided on a viewing angle control element forming surface of the liquid crystal display element and the optical axes of the polarizing layers of the viewing angle control element being provided between the liquid crystal display element and the viewing angle control element.

31. The viewing angle control element according to claim 19, wherein one of the polarizing layers is shared by a liquid crystal display unit.

32. A viewing angle control element comprising:
a pair of polarizing layers having transmission axes arranged to be substantially parallel to each other;

a liquid crystal layer disposed in between the pair of polarizing layers, the liquid crystal molecules adjacent to one polarizing layer and liquid crystal molecules adjacent to the other polarizing layer being aligned to be substantially perpendicular to the transmission axis of the nearest polarizing layer; and electrodes for applying voltage to the liquid crystal layer, a range of viewing angles with relatively high transmissivity is narrowed or broadened by applying voltage to the liquid crystal layer by the electrodes.

33. The viewing angle control element according to claim 32, product $\Delta$nd of the refractive-index anisotropy $\Delta$n of the liquid crystal layer and a thickness d of the liquid crystal layer being equal to or greater than 1.0 μm.

34. The viewing angle control element according to claim 32, product $\Delta$nd of the refractive-index anisotropy $\Delta$n of the liquid crystal layer and a thickness d of the liquid crystal layer being equal to or less than 8.0 μm.

35. The viewing angle control element according to claim 32, product $\Delta$nd of the refractive-index anisotropy $\Delta$n of the liquid crystal layer and a thickness d of the liquid crystal layer being equal to or greater than 2.0 μm, and equal to or less than 5.0 μm.

36. The viewing angle control element according to claim 32, a phase difference layer being provided between the pair of polarizing layers.

37. The viewing angle control element according to claim 36, the phase difference layer being provided at both sides of the liquid crystal layer.

38. The viewing angle control element according to claim 36, the phase difference layer having an optical characteristic of giving a phase difference to a component of light transmitted through the phase difference layer in a direction of thickness.

39. A display device, comprising the viewing angle control element according to claim 32 and a display element, the viewing angle control element adjusting the viewing angle of the display element.

40. A display device according to claim 39, the display element including a liquid crystal display element, and the viewing angle control element being provided on a front surface or a back surface of the liquid crystal display element.

41. A display device according to claim 40, the polarizing layer of the viewing angle control element on the liquid crystal display element side functioning as a polarizing layer of the liquid crystal display element.

42. A display device according to claim 40, an optical rotation device that adjusts a deviation between an optical axis of a polarizing layer provided on a viewing angle control element forming surface of the liquid crystal display element and the optical axes of the polarizing layers of the viewing angle control element being provided between the liquid crystal display element and the viewing angle control element.

43. The viewing angle control element according to claim 32, wherein one of the polarizing layers is shared by a liquid crystal display unit.

44. A viewing angle control element comprising:

a pair of polarizing layers having transmission axes arranged to be substantially parallel to each other;

a liquid crystal layer disposed in between the pair of polarizing layers, the liquid crystal molecules adjacent to one polarizing layer and liquid crystal molecules adjacent to the other polarizing layer being aligned to be substantially parallel to the transmission axis of the nearest polarizing layer; and electrodes for applying voltage to the liquid crystal layer, a range of viewing angles with relatively high transmissivity is narrowed or broadened according to whether voltage is applied or not applied to the liquid crystal layer by the electrodes.

45. The viewing angle control element according to claim 44, product $\Delta$nd of the refractive-index anisotropy $\Delta$n of the liquid crystal layer and a thickness d of the liquid crystal layer being equal to or greater than 1.0 μm.

46. The viewing angle control element according to claim 44, product $\Delta$nd of the refractive-index anisotropy $\Delta$n of the liquid crystal layer and a thickness d of the liquid crystal layer being equal to or less than 8.0 μm.

47. The viewing angle control element according to claim 44, product $\Delta$nd of the refractive-index anisotropy $\Delta$n of the liquid crystal layer and a thickness d of the liquid crystal layer being equal to or greater than 2.0 μm, and equal to or less than 5.0 μm.

48. The viewing angle control element according to claim 44, a phase difference layer being provided between the pair of polarizing layers.

49. The viewing angle control element according to claim 48, the phase difference layer being provided at both sides of the liquid crystal layer.

50. The viewing angle control element according to claim 48, the phase difference layer having an optical characteristic of giving a phase difference to a component of light transmitted through the phase difference layer in a direction of thickness.

51. A display device, comprising the viewing angle control element according to claim 44 and a display element, the viewing angle control element adjusting the viewing angle of the display element.

52. A display device according to claim 51, the display element including a liquid crystal display element, and the viewing angle control element being provided on a front surface or a back surface of the liquid crystal display element.

53. A display device according to claim 52, the polarizing layer of the viewing angle control element on the liquid crystal display element side functioning as a polarizing layer of the liquid crystal display element.

54. A display device according to claim 52, an optical rotation device that adjusts a deviation between an optical axis of a polarizing layer provided on a viewing angle control element forming surface of the liquid crystal display element and the optical axes of the polarizing layers of the viewing angle control element being provided between the liquid crystal display element and the viewing angle control element.

55. The viewing angle control element according to claim 44, wherein one of the polarizing layers is shared by a liquid crystal display unit.

* * * * *